(12) United States Patent
Sizar et al.

(10) Patent No.: US 11,936,625 B2
(45) Date of Patent: Mar. 19, 2024

(54) TECHNIQUES FOR PRIVATELY COLLECTING CONTENT DEDICATED TO A RECIPIENT FROM A PLURALITY OF CONTRIBUTORS

(71) Applicant: Kudoboard, Inc., Denver, CO (US)

(72) Inventors: Sohayle Sizar, Los Angeles, CA (US); Maxine Stern, New York, NY (US)

(*) Notice: Subject to any disclaimer, the term of this patent is extended or adjusted under 35 U.S.C. 154(b) by 263 days.

(21) Appl. No.: 17/570,199

(22) Filed: Jan. 6, 2022

(65) Prior Publication Data

US 2022/0224675 A1 Jul. 14, 2022

Related U.S. Application Data

(60) Provisional application No. 63/136,529, filed on Jan. 12, 2021.

(51) Int. Cl.
*H04L 9/40* (2022.01)
*G06F 21/62* (2013.01)
*H04L 51/08* (2022.01)

(52) U.S. Cl.
CPC .......... *H04L 63/04* (2013.01); *G06F 21/6245* (2013.01); *H04L 51/08* (2013.01)

(58) Field of Classification Search
CPC ...... H04L 63/04; H04L 51/08; G06F 21/6245
See application file for complete search history.

(56) References Cited

U.S. PATENT DOCUMENTS 11,113,466 B1 * 9/2021 Hira ....................... G06F 40/216
11,151,624 B1 * 10/2021 Chandak ................. G06Q 20/29
2014/0372910 A1 * 12/2014 Alford Mandzic .... G06Q 50/01 715/753
2015/0356649 A1 * 12/2015 Glass ..................... H04L 65/403 705/26.1
2016/0149843 A1 * 5/2016 Spicer ................... G06Q 10/101 709/206

(Continued)

OTHER PUBLICATIONS

Hu, "Friendships through Im: Examining the Relationship between Instant Messaging and Intimacy", https://academic.oup.com/jcmc/article/10/1/JCMC10111/4614464, Journal of Computer-Mediated Communication, 10(1):JCMC10111, Nov. 1, 2004 (28 pages).

(Continued)

*Primary Examiner* — Darshan I Dhruv
(74) *Attorney, Agent, or Firm* — Ansari Katiraei LLP; Arman Katiraei; Sadiq Ansari

(57) ABSTRACT

Techniques for privately collecting content dedicated to a recipient from a plurality of contributors are disclosed. In one particular embodiment, the techniques may be realized as a method for privately collecting content dedicated to a recipient from a plurality of contributors comprising: inviting the plurality of contributors to privately contribute content dedicated to a recipient before a deadline; receiving a first content from a first contributor dedicated to the recipient; receiving a second content from a second contributor dedicated to the recipient, wherein the first contributor is unable to access the second content and the second contributor is unable to access the first content; and presenting the first content and the second content to the recipient after the deadline.

20 Claims, 8 Drawing Sheets

(56) References Cited

U.S. PATENT DOCUMENTS

| | | | | |
|---|---|---|---|---|
| 2016/0154974 A1* | 6/2016 | Kisnisci | ............. | G06F 16/9535 |
| | | | | 726/28 |
| 2017/0118147 A1* | 4/2017 | Dold | .................... | H04W 4/021 |
| 2019/0220851 A1* | 7/2019 | Barnes | ............... | G06Q 20/3224 |
| 2020/0076746 A1* | 3/2020 | Penrose | ................... | G06N 3/08 |
| 2020/0387534 A1* | 12/2020 | Rendahl | ............... | G06F 16/685 |
| 2020/0403817 A1* | 12/2020 | Daredia | ................ | G06F 16/438 |
| 2021/0241333 A1* | 8/2021 | Lindsey | ................ | G06Q 40/02 |
| 2021/0406963 A1* | 12/2021 | Shukla | .............. | G06Q 30/0631 |

OTHER PUBLICATIONS

Stellabelle, "5 Reasons Private Messaging Apps Are Critical to Social Networks", The Startup, Medium, https://medium.com/swlh/5-reasons-private-messaging-apps-are-critical-to-social-networks-575e4f696e8f, Nov. 12, 2018 (16 pages).

* cited by examiner

TECHNIQUES FOR PRIVATELY COLLECTING CONTENT DEDICATED TO A RECIPIENT FROM A PLURALITY OF CONTRIBUTORS

CROSS-REFERENCE TO RELATED APPLICATIONS

This patent application claims priority to U.S. Provisional Patent Application No. 63/136,529, filed Jan. 12, 2021, which is hereby incorporated by reference herein in its entirety.

FIELD OF THE DISCLOSURE

The present disclosure relates generally to digital group collaboration technologies and, more particularly, to techniques for privately collecting content dedicated to a recipient from a plurality of contributors.

BACKGROUND OF THE DISCLOSURE

When individuals are invited to contribute to a group card dedicated to a recipient, through various media including, but not limited to photos, video, or text, they are able to see what other invited contributors have sent in. This creates one card signed by multiple contributors, which is then presented to the recipient.

This public nature of the content provided by contributors creates major social frictions that ultimately inhibit a contributor from fully expressing their sentiments and the recipient from fully knowing and experiencing the contributor's authentic sentiments. First, when contributors are aware that their content is accessible to other contributors, they have a lower likelihood of feeling comfortable or psychologically safe to share their true or authentic feelings with the recipient, which reduces the emotional impact of the content on the recipient. Second, contributors are more likely to alter the content they were originally planning on contributing when they view content provided by other contributors. This influences the authenticity of the content shared with the recipient, which provides a recipient a skewed narrative of the contributor's sentiments towards the recipient.

In view of the foregoing, it may be understood that there may be significant problems and shortcomings associated with current digital group collaboration technologies.

SUMMARY OF THE DISCLOSURE

Techniques for privately collecting content dedicated to a recipient from a plurality of contributors are disclosed. In one particular embodiment, the techniques may be realized as a method for privately collecting content dedicated to a recipient from a plurality of contributors comprising the steps of: inviting the plurality of contributors to privately contribute content dedicated to a recipient before a deadline; receiving a first content from a first contributor dedicated to the recipient; receiving a second content from a second contributor dedicated to the recipient, wherein the first contributor is unable to access the second content and the second contributor is unable to access the first content; and presenting the first content and the second content to the recipient after the deadline.

In accordance with other aspects of this particular embodiment, the content may comprise photos, video, or text.

In another particular embodiment, the techniques may be realized as a system for privately collecting content dedicated to a recipient from a plurality of contributors comprising one or more processors communicatively coupled to a network; wherein the one or more processors are configured to operate according to the method steps described above.

In another particular embodiment, the techniques may be realized as an article of manufacture for privately collecting content dedicated to a recipient from a plurality of contributors comprising: at least one processor readable storage medium; and instructions stored on the at least one medium; wherein the instructions are configured to be readable from the at least one medium by at least one processor and thereby cause the at least one processor to operate according to the method steps described above.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

DETAILED DESCRIPTION OF EMBODIMENTS

In order to facilitate a fuller understanding of the present disclosure, reference is now made to the accompanying drawings, in which like elements are referenced with like numerals. These drawings should not be construed as limiting the present disclosure, but are intended to be illustrative only.

When individuals are invited to contribute to a group card dedicated to a recipient, through various media including, but not limited to photos, video, or text, they are able to see what other invited contributors have sent in. This creates one card signed by multiple contributors, which is then presented to the recipient. In some embodiments, individuals may be able to contribute money as a gift for the recipient. In such embodiments, the monies received from multiple contributors are pooled together and presented to the recipient. In such embodiments, each contributor could potentially see how much money other contributors provided towards the gift.

This public nature of the content or money provided by contributors creates major social frictions that ultimately inhibit a contributor from fully expressing their sentiments and the recipient from fully knowing and experiencing the contributor's authentic sentiments. First, when contributors are aware that their content is accessible to other contributors, they have a lower likelihood of feeling comfortable or psychologically safe to share their true or authentic feelings to the recipient, which reduces the emotional impact of the content on the recipient. Second, contributors are more likely to alter the content they were originally planning on contributing when they view content provided by other contributors. This influences the authenticity of the content shared with the recipient, which provides a recipient a skewed narrative of the contributor's sentiments towards the recipient.

The present disclosure describes a new technique of soliciting content dedicated to a recipient until a designated time and date, where contributors are not exposed to content provided by other contributors. All the content provided by the various contributors is combined together and presented to a recipient at the designated time and date. The present disclosure also describes a new technique of soliciting a gift for a recipient until a designated time and date, where contributors are not exposed to the amount of money provided by other contributors. The present disclosure also describes a new technique to screen content that is submitted by contributors to allow only positive content to be sent to the recipient.

Figure 1:
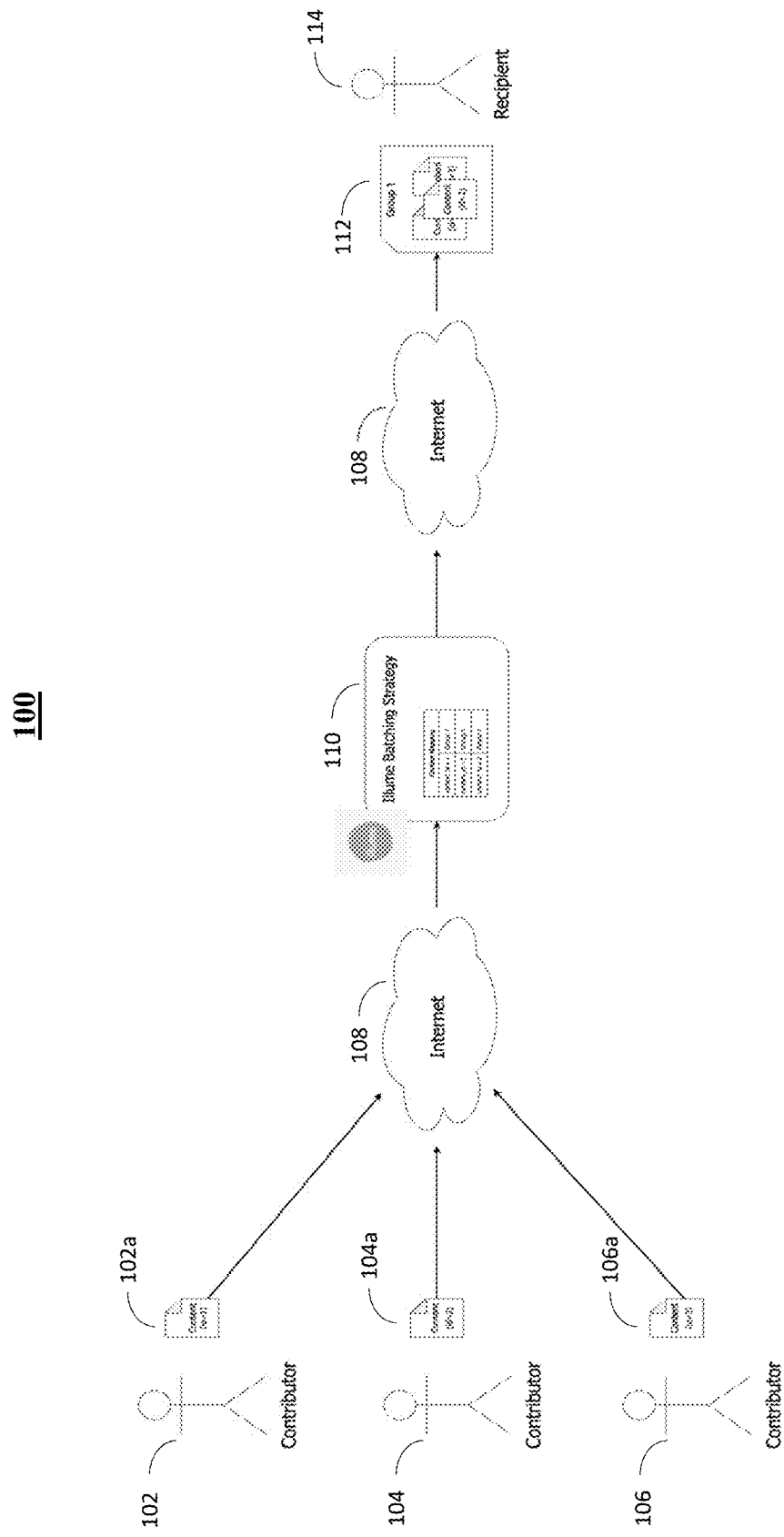
FIG. 1 shows a block diagram of a digital collaboration system in accordance with an embodiment of the present disclosure.

Referring to FIG. 1, there is shown a block diagram of a digital collaboration system 100 in accordance with an embodiment of the present disclosure. Within the system 100, a process may begin by extending an invite to a group of people to create content for an intended recipient 114. In some embodiments, the invite is created by a single initiator. In some embodiments, the invite is created by a plurality of initiators. In some embodiments, this invite may be created by a person who will also create content. The recipient 114 may be assigned a recipient ID by a server 110. The invite may be sent to the group of people by the server 110 over the internet 108, and the invite may include the recipient ID assigned to the recipient 114. The group of people receiving the invite may be referred to as contributors 102, 104, and 106. In some embodiments, contributors 102, 104, and 106 may be given a deadline by which they must provide their content. Each contributor 102, 104, and 106 may be assigned a unique contributor ID from the server 110. Contributors 102, 104, and 106 may use the unique contributor IDs to provide content 102a, 104a, and 106a, respectively, dedicated to the recipient 114 using either a mobile interface or a web interface provided by the server 110. In some embodiments, content may be in the form of a picture, a video, text, a graphics interchange format (GIF), or audio (e.g., a song). In some embodiments, content can include multiple pictures, videos, text, GIFs, or audio. The content provided by the contributors 102, 104, and 106 and associated with the unique contributor IDs are grouped together under the recipient ID associated with recipient 114.

Content 102a is not visible to anyone but contributor 102, and similarly content 104a is only visible to contributor 104 and content 106a is only visible to contributor 106. Content 102a, 104a, and 106a that is received at the server 110 may be batched into a group 112 using a batching strategy 110 at the server 110. The group 112 of content may then be presented to the recipient 114 via a webpage or a mobile interface. In some embodiments, the group 112 of content may be presented to the recipient 114 all at once at a designated date and time. In some embodiments, the group 112 of content may be presented to the recipient 114 at any time. The group 112 of content may be presented to the recipient 114 using a uniform resource locator (URL) link, or providing access to the recipient 114 to the server 110 using the recipient ID associated with the recipient 114. In some embodiments, the group 112 of content may be presented to the recipient 114 via short message service (SMS).

Figure 2:
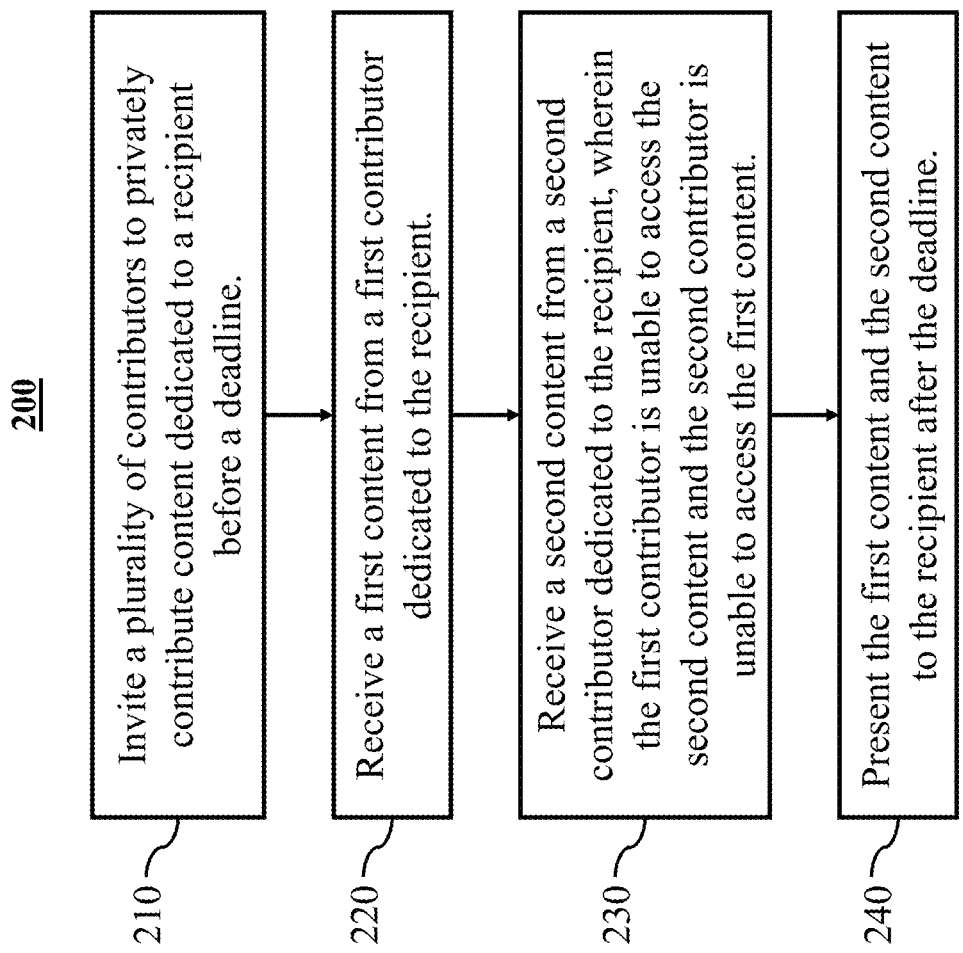
FIG. 2 shows a flow diagram of a digital collaboration system according to embodiments of the present disclosure.

FIG. 2 shows a flow diagram of actions performed by a server (e.g., server 110) in a digital collaboration system (e.g., digital collaboration system 100) according to embodiments of the present disclosure.

At 210, a plurality of contributors may be invited by a server to privately contribute content dedicated to a recipient before a deadline. Each contributor may be assigned a unique contribution ID that they may use to create and store content dedicated to the recipient at the server. The server may allow contributors to create content until a certain time and date.

The server 110 may invite the plurality of contributors to privately contribute content in response to a request by an initiator or a plurality of initiators to create a group card. For example, the initiator may provide the contributors' email addresses or phone numbers to the server 110. The server 110 may invite the plurality of contributors to contribute content via the internal, electronic mail, or short message service (SMS). In some embodiments, the server may provide a URL link to provide content, and the URL link may be sent by the initiator to contributors. In some embodiments, any person that receives the URL link may be a contributor. In some embodiments, the URL link will only work for specific persons. For example, the URL may only work for persons with a specified email address. In such embodiments, only persons with a specified email address can contribute content. As a result, in such embodiments, persons that do not have a specified email address are unable to contribute content.

At 220, the server may receive a first content from a first contributor dedicated to the recipient. The first contributor may not be able to access the content provided by any other contributor.

At 230, the server may receive a second content from a second contributor dedicated to the recipient. The second contributor may not be able to access the content provided by the first contributor, or any other contributor.

At 240, the server may present the first content and the second content to the recipient after the deadline. In some embodiments, the server may provide the content to the recipient as it is created.

Figure 3:
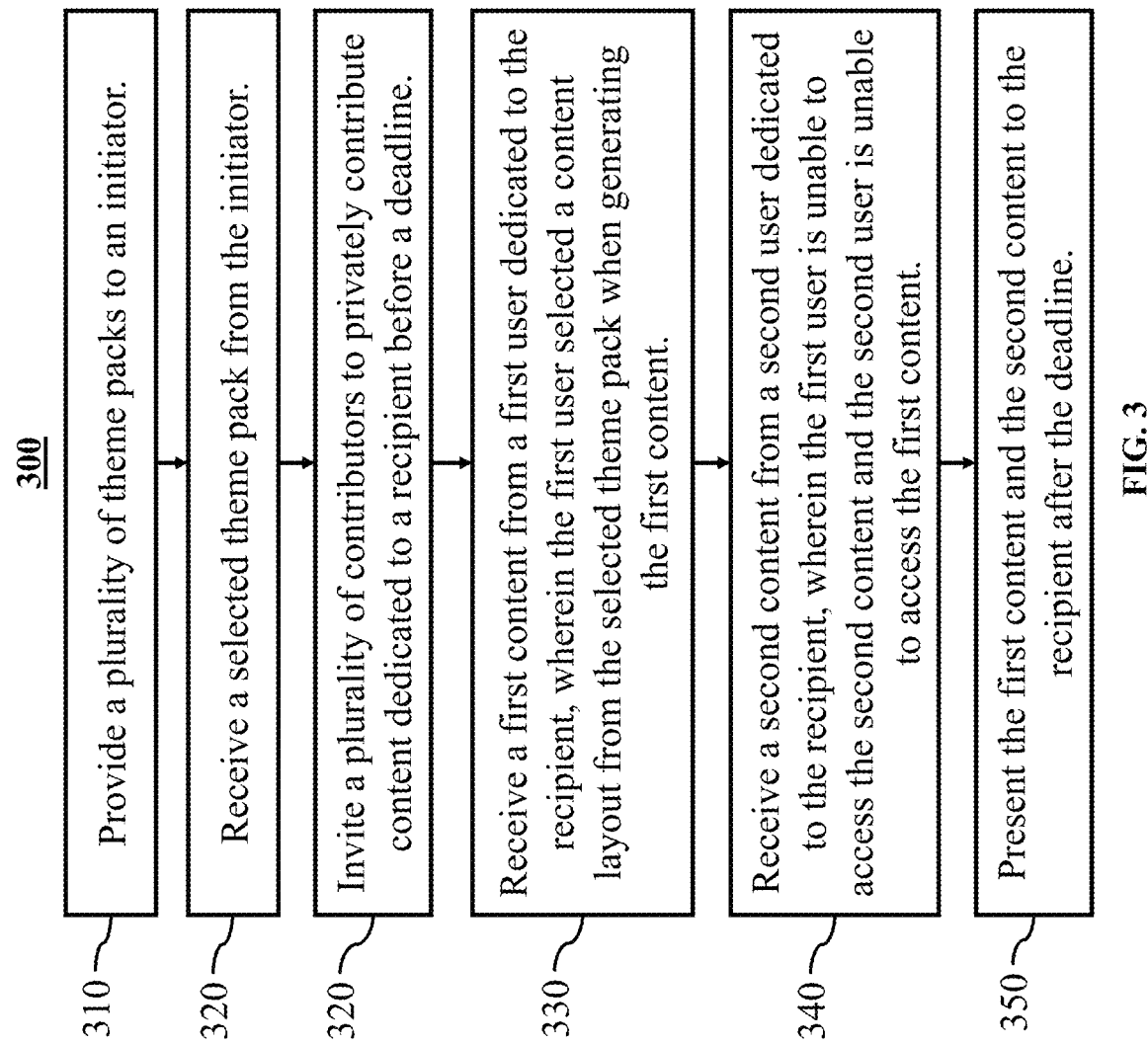
FIG. 3 shows a flow diagram for selecting a layout to create content in a digital collaboration system according to embodiments of the present disclosure.

FIG. 3 shows a flow diagram of actions performed by a server (e.g., server 110) in a digital collaboration system (e.g., digital collaboration system 100) according to embodiments of the present disclosure. At 310 the sever 110 may provide a plurality of theme packs to an initiator. The server may provide the plurality of theme packs in response to a request by the initiator to create a new group card for a recipient.

In some embodiments, the plurality of theme packs can include theme pack 311, theme pack 312, and theme pack 313. Theme pack 311 can include a plurality of different content layouts. The content layouts can be used by the contributors to privately create content. For example, contributors 102, 104, and 106 can use the content layouts to create content 102a, 104a, and 106a. The content layouts can include specific locations to add text and images. The content layouts can include a specific color or image for the background, and a specific color or font for the text. The content layouts can also include a specific location to add a video or GIF. In some embodiments, theme pack 311, theme pack 312, and theme pack 313 may have different colors. For example, theme pack 311 may have a plurality of different content layouts where each content layout is a different shade of blue, theme pack 312 may have a plurality of different content layouts where each content layout is a different shade of orange, and theme pack 313 may have a plurality of different content layouts where each content layout is a different shade of green. In other embodiments, the plurality of theme packs could have different background designs, where the layout of the text is varied for each content layout. For example, in one content layout, the text could be on the left side of the content layout, and in a separate content layout, the text could be on the right side of the content layout.

In some embodiments, the content layout can allow a contributor to select a sound to play when the content is viewed by the recipient. For example, the content layout could allow contributor 102 to include a twenty second sound when the content is displayed to the recipient. The sound could be a twenty second portion of a song. The sound could also be a twenty second audio clip of the sound of the ocean. In some embodiments, the sound only plays once for the set duration. In some embodiments, the sound will continuously play while the content is displayed to the recipient.

At 320, the server receives a selected theme pack from the initiator. For example, the initiator can select theme pack 311, theme pack 312, or theme pack 313.

In some embodiments, the initiator is unable to modify the plurality of theme packs provided by the server 110. In such embodiments, the initiator must select a theme pack that is provided by the server 110 (e.g., theme pack 311, theme pack 312, or theme pack 313). In other embodiments, the initiator is able to modify a theme pack in the plurality of theme packs provided by the server 110. In such embodiments, the initiator may want to select theme pack 311, but modify the font of the plurality of content layouts or modify the length of time sound plays while the content is displayed to the recipient. In such embodiments, the initiator is able to modify theme pack 311 to customize the theme pack 311 to meet the initiator's preferences for displaying the content to the recipient. In some embodiments, the initiator can request additional themes to be provided by serve 110. In such embodiments, the server 110 will provide additional theme packs to the initiator (e.g., theme pack 314, theme pack 315, and theme pack 316). The selected theme pack selected by the initiator and received by server 110 will be used by server 110 to generate the group card for the recipient.

At 320, a plurality of contributors may be invited by a server to privately contribute content dedicated to a recipient before a deadline. Each contributor may be assigned a unique contribution ID that they may use to create and store content dedicated to the recipient at the server. The server may allow contributors to create content until a certain time and date. The invitation will include the content layouts of the theme pack selected or created by the initiator.

At 330, the server 110 may receive a first content from a first contributor dedicated to the recipient. The first contributor may not be able to access the content provided by any other contributor. The first content received by the server 110 was generated by the first contributor using the content layouts of the theme pack selected or created by the initiator. When creating the first content, the first contributor will select a content layout of the theme pack selected or created by the initiator. Using the selected content layout, the first contributor can then create a personalized message for the recipient. In some embodiments, the first contributor is not able to modify the content layouts. In some embodiments, the first contributor can modify at least one of the content layouts. For example, the content layout may allow the first contributor to modify the font size of any text added by the first contributor. In some embodiments, the first contributor can modify and of the content layouts. In some embodiments, the first contributor can only modify specific aspects of the content layout. For example, the first contributor may be prohibited from modifying the color of the content layout, but may be permitted to modify the font size and placement of the font on the first content.

At 340, the server 110 may receive a second content from a second contributor dedicated to the recipient. The second contributor may not be able to access the content provided by the first contributor, or any other contributor. The second content received by the server 110 was generated by the second contributor using the content layouts of the theme pack selected or created by the initiator. For example, similar to creating the first content, when creating the second content, the second contributor will select a content layout of the theme pack selected or created by the initiator.

At 350, the server 110 may present the first content and second content to the recipient after the deadline. In some embodiments, the server may provide the content to the recipient as it is created. Because the first and second content were created from a theme pack selected by the initiator, the first and second content will have a consistent appearance to the recipient. Additionally, because the first and second content were created from a theme pack, the initiator can manage how the group card will appear to the recipient without being able to see the content created by each contributor.

Figure 4:
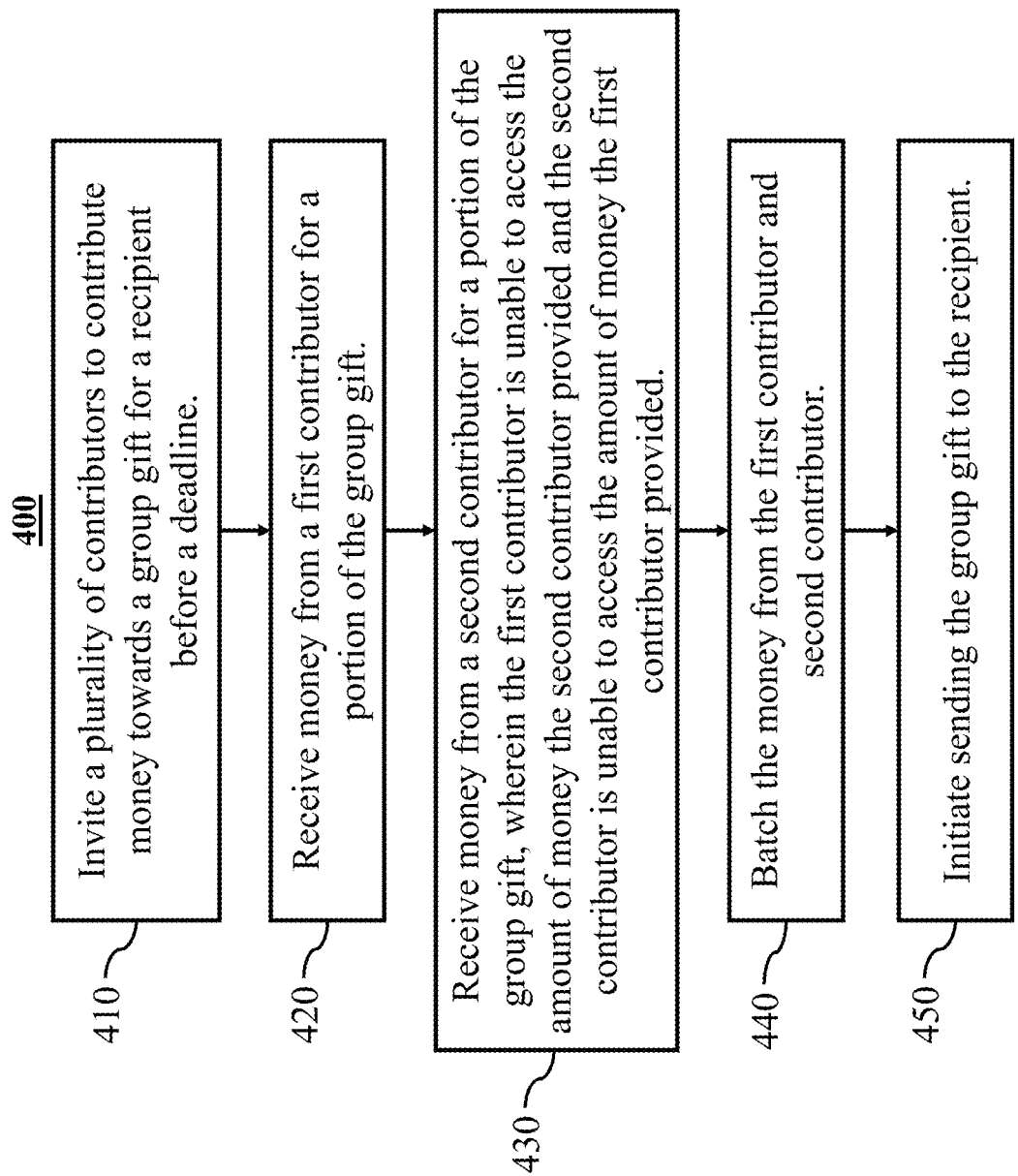
FIG. 4 shows a flow diagram for sending gifts in a digital collaboration system according to embodiments of the present disclosure.

FIG. 4 shows a flow diagram of actions performed by a server (e.g., server 110) in a digital collaboration system (e.g., digital collaboration system 100) according to embodiments of the present disclosure. In some embodiments, an initiator may desire to send a group gift to the recipient. In some embodiments, the group gift can be generated with a group card. In some embodiments, the group gift can be generated without a group card.

At 410, the server 110 invites a plurality contributors to privately contribute money for a group gift dedicated to a recipient before a deadline. Each contributor may be assigned a unique contribution ID that they may use to track the money provided by each contributor towards the group gift at the server. The server 110 may allow contributors to contribute money until a certain time and date. In some embodiments, the server 110 may allow contributors to contribute money until the purchase price of the gift is met.

In some embodiments, the server may allow contributors to contribute money until a certain goal is met.

In some embodiments, the server 110 may invite the plurality of contributors in response to a request by an initiator to send a group gift the recipient. In some embodiments, the initiator may input the group gift. As will be explained in greater detail in the context of FIG. 6, in some embodiments, the initiator can select a gift from a content database provided to the initiator.

In some embodiments, the group gift can be a gift card for a specified amount of money. In some embodiments, the group gift can be a gift card for the amount of money contributed by the contributors before a deadline. In some embodiments, the group gift could be for cryptocurrency or a non-fungible token (NFT). In some embodiments, the group gift could be a physical item such as a bicycle or football. In some embodiments, the group gift could be for an experience such as tickets to a football game.

In some embodiments, the initiator may input the group gift and how much the group gift will cost. For example, if the group gift is for cryptocurrency or a non-fungible token (NFT), the initiator may input an amount of money that must be pooled together to acquire cryptocurrency or a non-fungible token (NFT) for the recipient. In some embodiments, the initiator may also specify the type of money that can be provided by the contributors. For example, the initiator may allow contributors to send money in United States Dollars, Euros, Bitcoin, or Ethereum. In some embodiments, the server 110 may limit how contributors can send money. For example, the server 110 may only permit money to be sent in United States Dollars.

In some embodiments, the invitation includes a gift ID associated with the group gift and recipient. The gift ID allows the server to track the money received for the gift.

At 420, the server 110 receives money from a first contributor for a portion of the group gift. The money could be in the form of United States Dollars, Euros, Bitcoin, or Ethereum. The first contributor may not be able to access the amount of money provided by other contributors. In some embodiments, the money received by the first contributor is associated with a gift ID. This allows the server 110 to identify what gift the money is for and track how much money has been received for the gift.

At 430, the server 110 receives money from a second contributor for a portion of the group gift. The money could be in the form of United States Dollars, Euros, Bitcoin, or Ethereum. The second contributor may not be able to access the amount of money provided by the first contributor, or any other contributor. In some embodiments, the money received by the second contributor is associated with a gift ID.

At 440, the server 110 may batch the money from the first contributor and second contributor. If the money is the same form, the money is combined together. If the money is in a different form (e.g., the first contributor sends money in United States Dollars and the second contributor sends money in Euros), the money can be converted into the same format and combined together. In some embodiments, the money is batched by combining all money provided by contributors with the same gift ID.

At 450, the server 110 initiates sending the group gift to the recipient. In some embodiments, the server 110 sends a message and the batched money to an individual to acquire the gift and send it to the recipient. For example, a message can be sent to an individual with $100 dollars instructing the individual to purchase a $100 gift card and send the gift card to the recipient. In some embodiments, the server 110 will acquire the gift and send it to the recipient. For example, the server 110 can acquire a $100 gift and send the gift card to the recipient. In some embodiments, the gift will be sent to the recipient via the postal service or a carrier. In some embodiments, the gift will be electronically sent to the recipient via the internet, electronic mail, or a short message service (SMS). In some embodiments, the gift will be sent to the recipient by a merchant. In such embodiments, the merchant will be notified of the gift and send the gift to the recipient (e.g., by postal service, carrier, internet, electronic mail, or SMS).

In some embodiments, a company may allow initiators and contributors to send group gifts over server 110 at no cost to the initiators and contributors. In such embodiments, the company may allow merchants to provide specific group gifts for initiators to select and send to a recipient. Also in such embodiments, the company may receive a processing fee from the merchant when an initiator and contributors select and acquire a group gift for a recipient.

Figure 5:
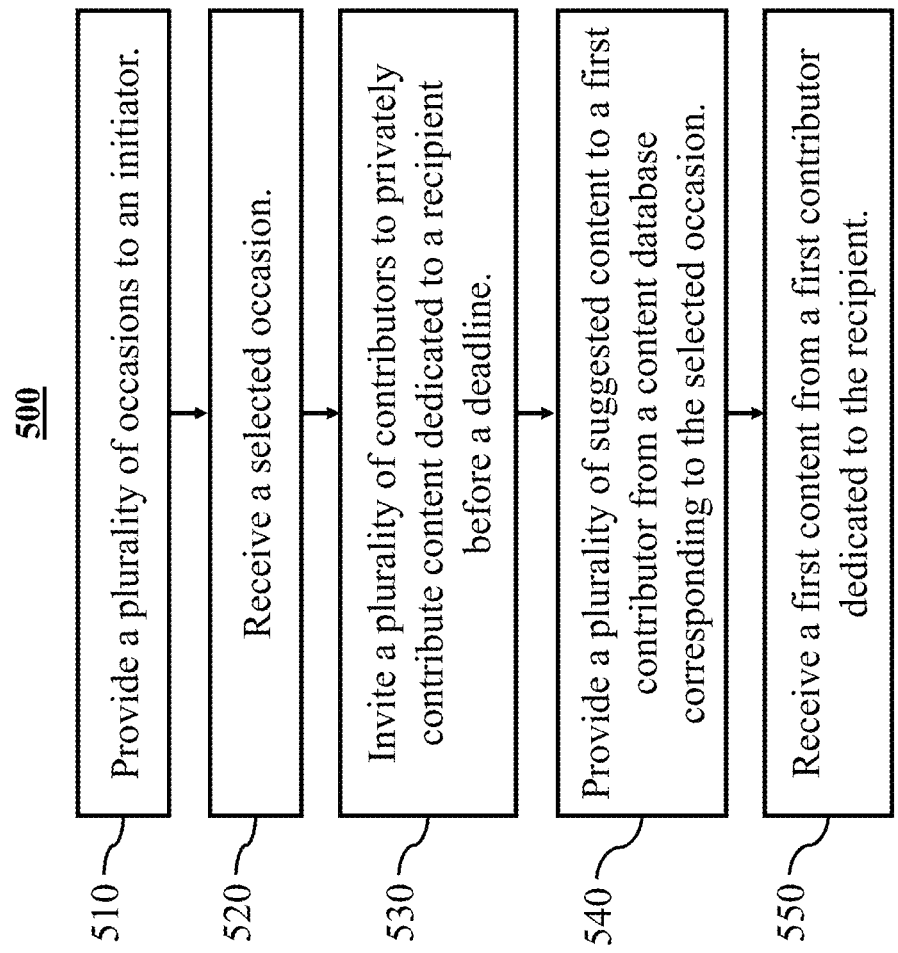
FIG. 5 shows a flow diagram for suggesting content in a digital collaboration system according to embodiments of the present disclosure.

FIG. 5 shows a flow diagram of actions performed by a server (e.g., server 110) in a digital collaboration system (e.g., digital collaboration system 100) according to embodiments of the present disclosure. In some embodiments, it would be beneficial to provide suggested content to contributors. For example, the suggested content can be based on different occasions (e.g., work anniversary or birthday).

At 510, the server 110 provides a plurality of occasions to an initiator. The server may provide the plurality of occasions in response to a request by the initiator to create a new group card for a recipient. For example, the plurality of occasions can include occasion 511, occasion 512, and occasion 513. The occasions can consist of various milestones or events where contributors give a recipient a group card. For example, occasion 511 may be a work anniversary, occasion 512 may be a birthday, or occasion 513 may be baby shower.

At 520, the server 110 receives a selected occasion. For example, the initiator may select occasion 511, which is a work anniversary. In some embodiments, the initiator may request additional occasions to be provided. In such embodiments, the server 110 will provide additional occasions (e.g., occasion 514, occasion 515, and occasion 516).

At 530, a plurality of contributors may be invited by a server to privately contribute content dedicated to a recipient before a deadline. Each contributor may be assigned a unique contribution ID that they may use to create and store content dedicated to the recipient at the server. The server may allow contributors to create content until a certain time and date. The invitation may include information on the occasion selected by the recipient.

At 540, the server 110 provides a plurality of suggested content to a first contributor from a content database corresponding to the selected occasion. The content database may be stored in the memory of the server 110, or it may be stored in a separate server or memory that communicates with server 110. The plurality of suggested contented provided to the first contributor corresponds to the occasion selected by the initiator. For example, the plurality of suggested content can include suggested content 541, suggested content 542, and suggested content 543. If the initiator selects occasion 511, which is the work anniversary, the suggested content provided to the first contributor will correspond to content for a work anniversary. For example suggested content 541 may include text stating: "Your work ethic inspires me. I am grateful for your contributions, passion, and support that you've provided over the year. If only we had more colleagues like you!" Suggested content 542 may include text stating: "Congratulations to the most stellar, awesome, inspiring, and passionate colleague I know! Not only do you inspire me, but all of the team to be our best selves. I am grateful for you." And suggested content 543 may include text stating: "What an adventure it's been this year. Working alongside you has been an absolute privilege." If the initiator selected a different occasion, such as occasion 512 which is for a birthday, the suggested content may include text corresponding to a message for a person's birthday.

In some embodiments, the initiator may request additional suggested content. In such embodiments, the server 110 will provide additional suggested content (e.g., suggested content 544, suggested content 545, and suggested content 546).

At 550, the serve receives first content from a first contributor dedicated to the recipient. In some embodiments, the first contributor can select the suggested content and modify the suggested content for the recipient. In such embodiments, the modified suggested content is received by the server 110 as the first content. In some embodiments, the first contributor cannot select any of the suggested content when creating the first content. In such embodiments, the suggested content can be used as inspiration for a first content. In such embodiments, the first content received by the server 110 was not created by modifying any suggested content.

Further, in some embodiments, the plurality of theme packs provided to the initiator as described in the context of FIG. 3 may be based on an occasion selected by the initiator. For example, if the initiator selects a birthday as the occasion, the plurality of theme packs provided to the initiator may include theme packs directed to a group birthday card. In some embodiments, if the initiator selects a birthday as the occasion, the plurality of theme packs provided to the initiator may only include theme packs directed to a group birthday card.

Figure 6:
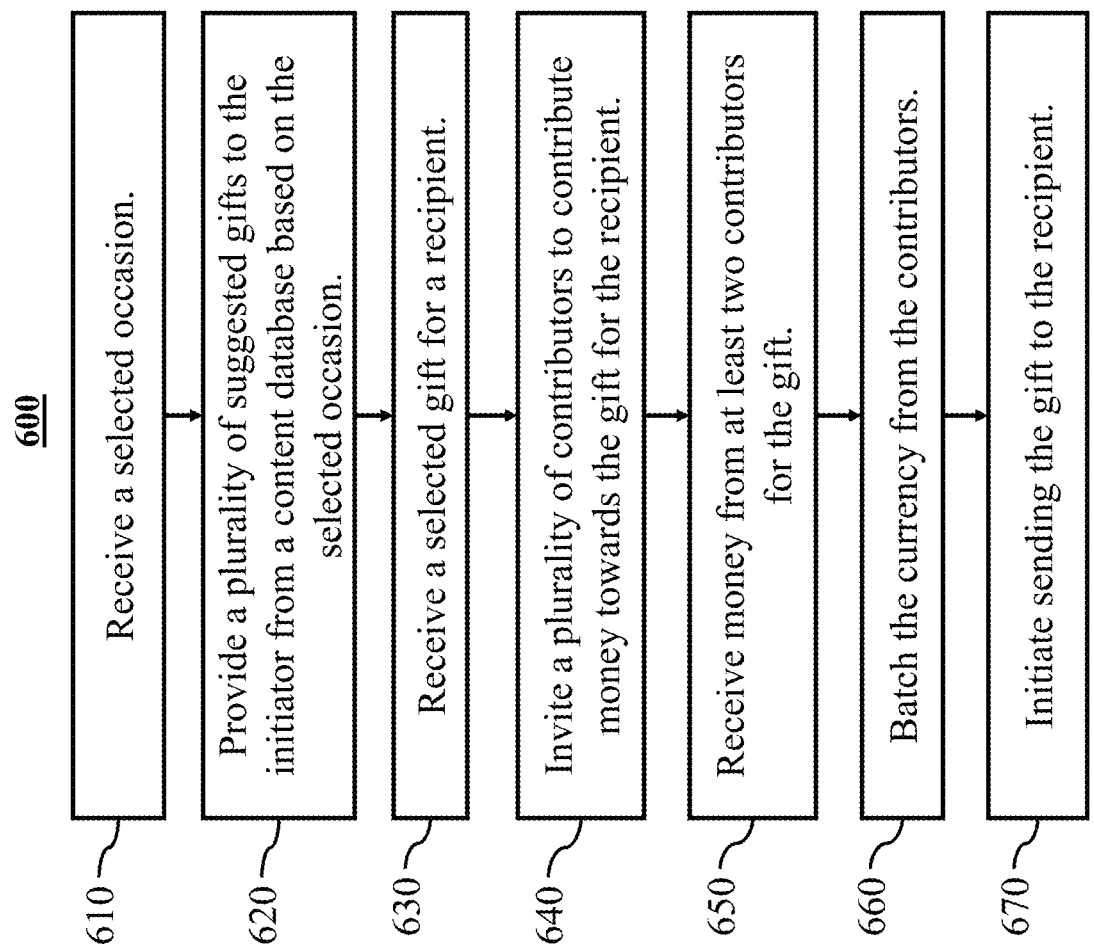
FIG. 6 shows a flow diagram for suggesting a gift in a digital collaboration system according to embodiments of the present disclosure.

FIG. 6 shows a flow diagram of actions performed by a server (e.g., server 110) in a digital collaboration system (e.g., digital collaboration system 100) according to embodiments of the present disclosure. In some embodiments, it would be beneficial to provide suggested group gifts to initiators. For example, the suggested group gift can be based on different occasions (e.g., work anniversary or birthday).

At 610, the server 110 receives a selected occasion from a recipient. In some embodiments, the server 110 may receive the selected occasion from an initiator following a request by the initiator to create a new group card for a recipient. For example, an initiator may send a request to the server 110 for a new group card for a recipient. The server 110 may provide a plurality of occasions in response to the request by the initiator to create a new group card for a recipient. The plurality of occasions provided to the initiator can include occasion 611, occasion 612, and occasion 613. The occasions can consist of various milestones or events where contributors give a recipient a group card. For example, occasion 611 may be a work anniversary, occasion 612 may be a birthday, or occasion 613 may be baby shower. In some embodiments, the initiator may select an occasion from the plurality of occasions. In some embodiments, the initiator may request the server provide additional occasions (e.g., occasion 614, occasion 615, and occasion 616).

At 620, the server 110 provides suggested gifts to the initiator from a content database based on the selected occasion. The content database may be stored in the memory of the server 110, or it may be stored in a separate server or memory that communicates with server 110. The plurality of suggested gifts provided to the initiator corresponds to the occasion selected by the initiator. For example, the plurality of suggested content can include suggested gift 641, suggested gift 642, and suggested gift 643. If the initiator selects occasion 611, which is a work anniversary, the suggested gifts provided to the initiator will correspond to gifts for a work anniversary. For example, suggested gift 641 may be a mug with a positive, affirmative message. Suggested gift 642 may be a cooking class with a private chef. And suggested gift 643 may be rare coffee sourced from a local coffee roaster. If the initiator selected a different occasion, such as occasion 612 which is for a birthday, the suggested gifts would correspond to gifts for a person's birthday.

In some embodiments, the initiator may request additional suggested gifts. In such embodiments, the server 110 will provide additional suggested gifts (e.g., suggested gift 644, suggested gift 645, and suggested gift 646). In some embodiments, the initiator may request suggested gifts within a specific price range. For example, the initiator can request to only view suggested gifts within $50 to $100.

At 630, the server 110 receives the selected gift for the recipient. In some embodiments, the gift is selected from the plurality of suggested gifts provided to the initiator. In some embodiments, the gift is not from the plurality of suggested gifts provided to the initiator. In such embodiments, the suggested gifts provided to the initiator may help the initiator determine a group gift for the recipient.

At 640, the server 110 invites a plurality contributors to privately contribute money for a group gift dedicated to a recipient before a deadline. Each contributor may be assigned a unique contribution ID that they may use to track the money provided by each contributor towards the group gift at the server. The server 110 may allow contributors to contribute money until a certain time and date. In some embodiments, the server 110 may allow contributors to contribute money until the purchase price of the gift is met. In some embodiments, the server may allow contributors to contribute money until a certain goal is met. In some embodiments, the gift may be a gift card, cryptocurrency, or a non-fungible token (NFT). In some embodiments, the initiator may also specify the type of money that can be provided by the contributors. For example, the initiator may allow contributors to send money in United States Dollars, Euros, Bitcoin, or Ethereum. In some embodiments, the server 110 may limit how contributors can send money. For example, the server 110 may only permit money to be sent in United States Dollars. In some embodiments, the invitation includes a gift ID associated with the group gift and recipient. The gift ID allows the server to track the money received for the gift.

At 650, the server 110 receives money from at least two contributors for the gift. In some embodiments, the server 110 may receive money from only one contributor for the group gift. In such embodiment, one contributor may provide enough money for the gift where further contributions by other contributors is not required. In some embodiments, the money received from a first contributor is associated with a gift ID. In some embodiments, the money received from a second contributor is associated with a gift ID.

At 650, the server 110 may batch the money received from the at least two contributors. In some embodiments, the money is batched by combining all money provided by contributors with the same gift ID.

At 660, the server 110 initiates sending the group gift to the recipient. In some embodiments, the server 110 sends a message and the batched money to an individual to acquire the gift and send it to the recipient. In some embodiments, the gift will be electronically sent to the recipient via the internet, electronic mail, or a short message service (SMS). In some embodiments, the gift will be sent to the recipient by a merchant. In such embodiments, the merchant will be notified of the gift and send the gift to the recipient (e.g., by postal service, carrier, internet, electronic mail, or SMS).

In some embodiments, a company may allow initiators and contributors to send group gifts over server 110 for a fee. In such embodiments, the company may collect a transaction fee from contributors that send a gift over server 110. For example, if the group collects $105 for a gift card, the company may collect a $5 transaction fee to send the group gift. In such embodiments, the contributors will contribute $105, the company will collect $5, and recipient will receive $100.

In some embodiments, the company may charge a shipping transaction fee to send the gift to the recipient. For example, if the group gift is a $100 gift card, the company may charge a $5 shipping transaction fee. In some embodiments, the company may allow contributors to contribute money towards a group gift using a credit card. In such embodiments, the contributors may be charged a credit card transaction fee. For example, if the contributor wants to contribute $100, the company may charge a $3 credit card transaction fee.

In some embodiments, a company may allow a merchant to post goods or serves for initiators to select for a group gift. For example, a company may allow merchants to post goods or servers in the content database. In such embodiments, the company may charge the merchant a listing fee for every good or service posted in the content database. Also in such embodiments, the company may charge merchants a monthly subscription fee to have the posted goods or services promoted to initiators. For example, a merchant may pay an additional fee for its goods or services to appear in a first group of suggested gifts to an initiator (e.g., include suggested gift 641, suggested gift 642, and suggested gift 643) or second group of suggested gifts to an initiator (e.g., suggested gift 644, suggested gift 645, and suggested gift 646). Also in such embodiments, the company may charge merchants an advertising fee to promote goods or services for specific occasions selected by an initiator. For example, if a merchant's good is suggested gift 641 (e.g., a mug with a positive, affirmative message), the merchant may pay an advertising fee for its good to be a suggested gift when an initiator selects a specific occasion (e.g., when an initiator selects occasion 611, which is a work anniversary, suggest gift 641 will be provided to the initiator).

Figure 7:
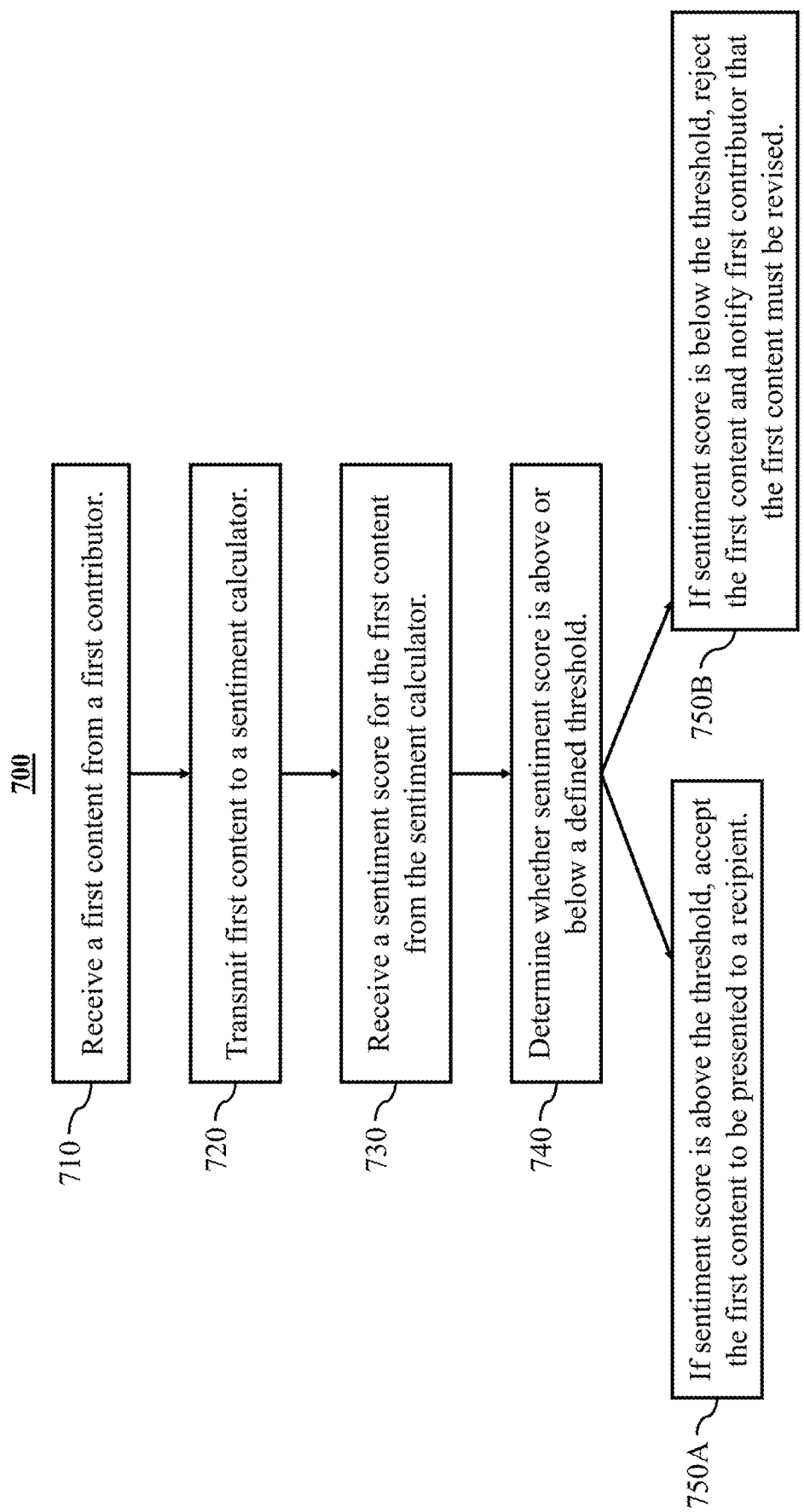
FIG. 7 shows a flow diagram for a sentiment calculator used in a digital collaboration system according to embodiments of the present disclosure.

FIG. 7 shows a flow diagram of actions performed by a server (e.g., server 110) in a digital collaboration system (e.g., digital collaboration system 100) according to embodiments of the present disclosure. In some embodiments, it would be beneficial to review each content created by a contributor before the content is presented to a recipient. For example, it would be beneficial to review each content to confirm the content does not include any negative messages that might negatively impact the recipient. To allow the content created by each contributor to remain private to the initiator and other contributors, a sentiment score can be determined for each content to prevent negative messages from being sent to a recipient.

At 710, the server 110 receives a first content from a first contributor. The first content may include at least written message to the recipient.

At 720, the server 120 transmits the first content to a sentiment calculator. The sentiment calculator could be within server 110. In some embodiments, the sentiment calculator may also be a specific processor within server 110. In some embodiments, the sentiment calculator may be a separate server that communicates with server 110. In such embodiments, the server 110 may communicate with the separate server via the internet.

The sentiment calculator analyzes content submitted by a contributor and determines a sentiment score. In some embodiments, the sentiment score may range from 0 to 100. A score of 0 means the message is very negative, and a score of 100 means the message is very positive. In such embodiments, the sentiment calculator will analyze a written message on a content and determine a sentiment score on a scale of 0 to 100 (e.g., the sentiment score may be 85 or 45). For example, the first content received by the first contributor may be transmitted to the sentiment calculator, and the sentiment calculator may determine the first content has a sentiment score of 75.

At 730, the sever 110 receives a sentiment score for the first content from the sentiment calculator. In some embodiments, the received score will be a number between 0 and 100. For example, the sever 110 may receive a sentiment score of 75 for the first content.

At 740, the sever 110 determines whether the sentiment score is above or below a defined threshold. For example, in some embodiments where the sentiment score on a scale of 0 to 100, it may be determined that recipients should not receive any content that has a sentiment score of equal to or less than 50. In such embodiments, it is desired to not send any content that might contain a negative message, and the defined threshold is 50.

In some embodiments, it might be desired to only send content to a recipient that is very positive. In such embodiments, the defined threshold may be 70. In such embodiments, some content may not have negative content, but the content may not contain enough positive content to be sent to the recipient. For example, if the sentiment score for the first content is 75, the server 110 would determine that the first content has a sentiment score that is above the defined threshold. However, if the sentiment score for the first content is 65, the sever 110 would determine that the first content has a sentiment score that is below the defined threshold.

At step 750A, if the sentiment score is above the defined threshold, the first content is accepted by the server 110 to be presented to the recipient. In some embodiments, the server may present the first content to the recipient after the deadline. In some embodiments, the server may provide the content to the recipient after the content is accepted.

At step 750B, if the sentiment score is below the threshold, the first content is rejected, and the first contributor is notified that the first content must be revised. In some embodiments, the first contributor may be notified via the internet, email, or SMS. Once the first contributor revises the first content, the process described in the context of FIG. 7 may be repeated until the first content is accepted.

Figure 8:
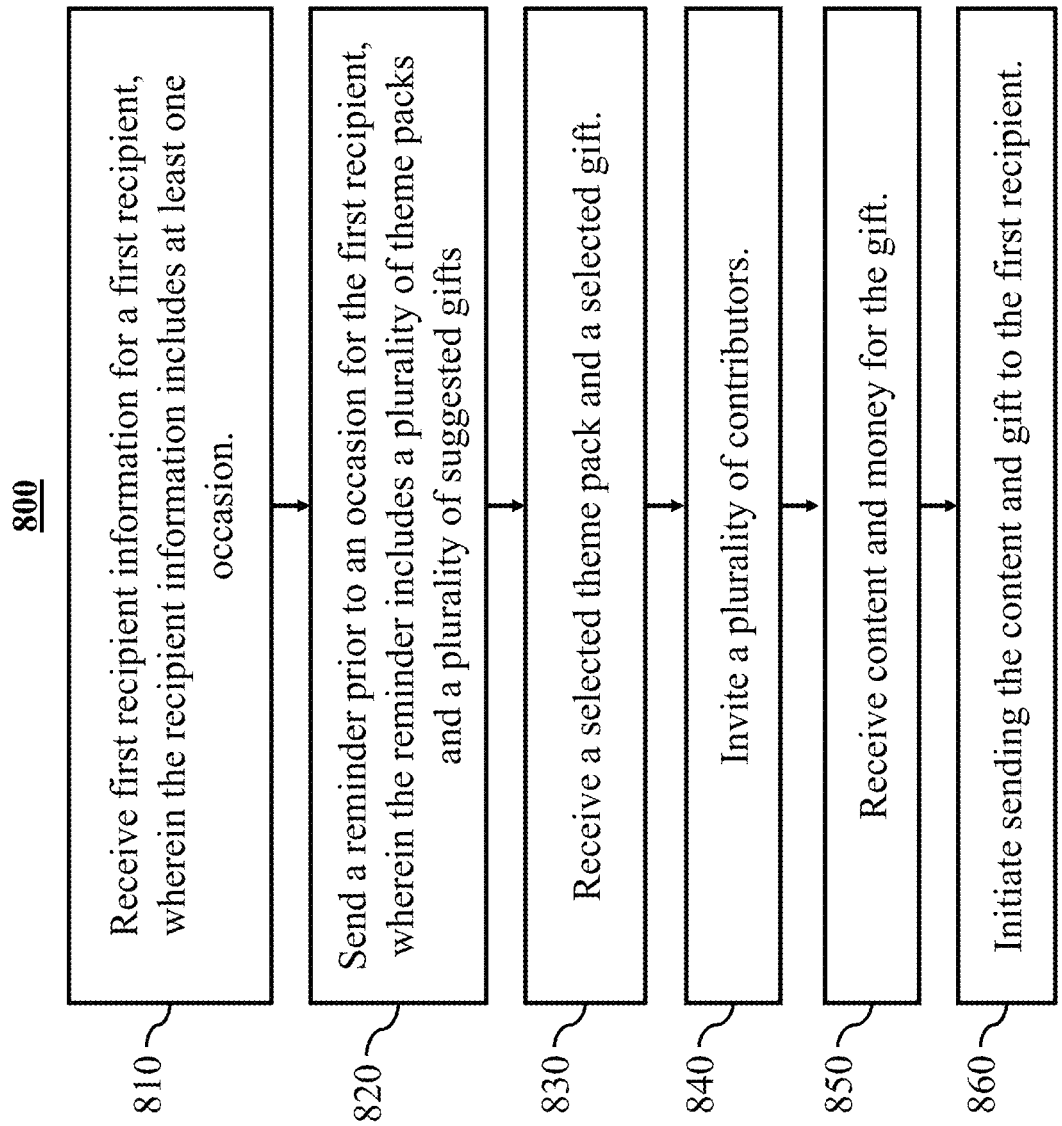
FIG. 8 shows a flow diagram for a relationship management system according to embodiments of the present disclosure.

FIG. 8 shows a flow diagram of actions performed by a server (e.g., server 110) in a digital collaboration system (e.g., digital collaboration system 100) according to embodiments of the present disclosure. In some embodiments, an initiator can create a customer relationship management (CRM) system.

At 810, the server 110 may receive first recipient information for a first recipient from an initiator. The first recipient information may include at least one the occasion. In some embodiments, the at least one occasion may be a birthday or a work anniversary. In some embodiments, the first recipient information may include the recipient's name.

In some embodiments, the first recipient information may include a deadline to send a card, a gift, or a card and gift.

At 820, the server 810 may send a reminder to the initiator for an occasion. In some embodiments, the server 810 may send the reminder via the internet, email, or SMS to the initiator two weeks before the occasion for the first recipient to remind the initiator of the upcoming occasion. For example, the initiator may receive a reminder via email two weeks before a first recipient's birthday reminding the initiator of the first recipient's birthday. In some embodiments, the reminder also includes a plurality of theme packs for sending content to a recipient and a plurality of suggested gifts for the recipient. In some embodiments, the reminder may only include a plurality of theme packs. In some embodiments, the reminder may only include a plurality of suggested gifts for the recipient.

At 830, the server 110 receives a selected theme pack and a selected gift for the recipient. For example, the theme pack and gift may be selected similar to the methods described in the context of FIGS. 3 to 6.

At 840, the server 110 invites a plurality of contributors to contribute content and money towards the gift for the first recipient. For example, the contributors can contribute content and money similar to the methods described in the context of FIGS. 1 to 6.

At 850, the server 110 may receive content from the plurality of contributors and money for the gift. The server may also batch the money received for the gift from the plurality of contributors. For example, the server 110 may receive the content and money from the plurality of contributors similar to the methods described in the context of FIGS. 1 to 6.

At 860, the server 110 may initiate sending the content and gift to the first recipient. For example, the server 110 may initiate sending the content and gift to the first recipient similar to the methods described in the context of FIGS. 1 to 6. In some embodiments, only content will be created and sent to the first recipient. In some embodiments, only a gift will be created and sent to the first recipient. In some embodiments, the server 110 sends an invitation to only one contributor.

In some additional embodiments, the initiator may desire to review the appearance of the group card before the card is sent to the recipient. In such a circumstance, the initiator can review the content layout submitted by the contributors with the text or images created by the contributors hidden from the initiator. For example, the text or images created by the contributors can be redacted from the content layout. In such a circumstance, the initiator can review the general appearance of each contributor's content while the specific content is still private to the contributor and recipient.

In other embodiments, the server 110 may keep track of the contributors that have submitted content for the group card. For example, the server may provide a list to the initiator specifying the contributors that have provided content and the persons who have been invited to provide content, but have not yet submitted any content. This allows the initiator to track who still needs to create and submit content for the group card.

In other embodiments, an initiator may seek to create a group card for a public group of recipients. For example, an initiator may seek to create a group card for all firefighters in a specific town. In some embodiments, the content that is created by contributors will be publicly available. In some embodiments, the content that is created by contributors can be viewed by a specified group of recipients (e.g., only the firefighters in the specific town can view the content).

At this point it should be noted that providing content dedicated to a recipient that is collected privately from contributors in accordance with the present disclosure as described above may involve the processing of input data and the generation of output data. This input data processing and output data generation may be implemented in hardware or software. For example, specific electronic components may be employed in a mobile device or similar or related circuitry for implementing the functions associated with providing content dedicated to a recipient that is collected privately from contributors in accordance with the present disclosure as described above. Alternatively, one or more processors operating in accordance with instructions may implement the functions associated with providing content dedicated to a recipient that is collected privately from contributors in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for privately collecting content dedicated to a recipient from a plurality of contributors, the method comprising:

inviting the plurality of contributors to privately contribute custom content dedicated to the recipient before a deadline, wherein the recipient is associated with a particular group;

receiving a first content from a first contributor dedicated to the recipient;

receiving a second content from a second contributor dedicated to the recipient, wherein the first contributor is unable to access the second content and the second contributor is unable to access the first content;

generating a group card by arranging the first content and the second content according to one or more content layouts of a theme pack;

presenting a generalized appearance of the group card with text or images of the first content and the second content arranged according to the one or more content layouts hidden from a first viewer in response to the first viewer not being associated with the particular group; and presenting the group card with the text or images of the first content and the second content arranged according to the one or more content layouts to a second viewer in response to the second viewer being associated with the particular group or the second viewer corresponding to the recipient.

2. The method of claim 1, wherein the custom content comprises photos, videos, or text.

3. The method of claim 1, further comprising:
providing a plurality of theme packs to an initiator; and
receiving a selection of the theme pack from the initiator.

4. The method of claim 1, wherein the theme pack includes the one or more content layouts that each of the first contributor and the second contributor use to generate the first content and the second content.

5. The method of claim 4, wherein the first content is created by the first contributor using a first content layout from the one or more content layouts of the theme pack, and wherein the second content is created by the second contributor using a second content layout from the one or more content layouts of the theme pack that has different stylization or coloring than the first content layout.

6. The method of claim 1, further comprising:
inviting the plurality of contributors to privately contribute money for a group gift prior to the deadline;
receiving a first portion of money from the first contributor;
receiving a second portion of money from the second contributor;
combining the first portion of money and the second portion of money as the group gift; and
initiating sending the group gift to the recipient.

7. The method of claim 1, further comprising:
providing a plurality of suggested content to the first contributor.

8. The method of claim 7, further comprising:
receiving a selection of an occasion; and
selecting the plurality of suggested content from different content that is associated with different occasions in response to the selection of the occasion.

9. The method of claim 1, wherein the first and second content are presented to the recipient via a uniform resource locator (URL) link or short message service (SMS).

10. The method of claim 1, further comprising:
sending the first content to a sentiment calculator;
receiving a first sentiment score for the first content from the sentiment calculator;
adding the first content to the group card in response to the first sentiment score satisfying a threshold; and
requesting that the first contributor revise the first content prior to the first content being added to the group card in response to the first sentiment score not satisfying the threshold.

11. A system for privately collecting content dedicated to a recipient from a plurality of contributors comprising:
one or more hardware processors communicatively coupled to a network, wherein the one or more hardware processors are configured to:
invite the plurality of contributors to privately contribute custom content dedicated to the recipient before a deadline, wherein the recipient is associated with a particular group;
receive a first content from a first contributor dedicated to the recipient;
receive a second content from a second contributor dedicated to the recipient, wherein the first contributor is unable to access the second content and the second contributor is unable to access the first content;
generate a group card by arranging the first content and the second content according to one or more content layouts of a theme pack;
present a generalized appearance of the group card with text or images of the first content and the second content arranged according to the one or more content layouts hidden from a first viewer in response to the first viewer not being associated with the particular group; and
present the group card with the text or images of the first content and the second content arranged according to the one or more content layouts to a second viewer in response to the second viewer being associated with the particular group or the second viewer corresponding to the recipient.

12. The system of claim 11, wherein the content comprises photos, video, or text.

13. The system of claim 11, wherein the one or more hardware processors are further configured to:
provide a plurality of theme packs to an initiator; and
receive a selection of the theme pack from the initiator.

14. The system of claim 11, wherein the theme pack includes the one or more content layouts that each of the first contributor and the second contributor use to generate the first content and the second content.

15. The system of claim 14, wherein the first content is created by the first contributor using a first content layout from the one or more content layouts of the theme pack, and wherein the second content is created by the second contributor using a second content layout from the one or more content layouts of the theme pack that has different stylization or coloring than the first content layout.

16. An article of manufacture for privately collecting content dedicated to a recipient from a plurality of contributors, the article of manufacture comprising:
at least one processor readable storage medium; and
instructions stored on the at least one medium;
wherein the instructions are configured to be readable from the at least one medium by at least one hardware processor and thereby cause the at least one hardware processor to operate so as to:
invite the plurality of contributors to privately contribute custom content dedicated to the recipient before a deadline, wherein the recipient is associated with a particular group;
receive a first content from a first contributor dedicated to the recipient;
receive a second content from a second contributor dedicated to the recipient, wherein the first contributor is unable to access the second content and the second contributor is unable to access the first content;
generate a group card by arranging the first content and the second content according to one or more content layouts of a theme pack;
present a generalized appearance of the group card with text or images of the first content and the second content arranged according to the one or more content layouts hidden from a first viewer in response to the first viewer not being associated with the Particular group; and
present the group card with the text or images of the first content and the second content arranged according to the one or more content layouts to a second viewer in response to the second viewer being associated with the particular group or the second viewer corresponding to the recipient.

17. The method of claim 1, further comprising:
determining an occasion that is associated with the group card; and
presenting a suggested gift that is offered by a particular merchant for the occasion and that is available for including with the group card.

18. The method of claim 17, further comprising:
collecting a fee from the particular merchant in response to presenting the suggested gift that is offered by the particular merchant for the occasion.

19. The method of claim 1, further comprising:
receiving a selection of a gift from a plurality of gifts offered by a plurality of merchants;
collecting a first gift amount from the first contributor before the deadline;
collecting a second gift amount from the second contributor before the deadline;
determining that the first gift amount and the second gift amount are equal to or greater than an amount for purchasing the gift;
acquiring the gift from a merchant that offers that gift using the first gift amount and the second gift amount; and
providing the gift to the recipient after the deadline.

20. The method of claim 10, wherein requesting that the first contributor revise the first content comprises:
notifying the first contributor that the first sentiment score associated with the first content does not satisfy the threshold;
receiving a third content from the first contributor in response to notifying the first contributor; and
replacing the first content in the group card with the third content.

* * * * *